(12) United States Patent
Moh

(10) Patent No.: US 6,218,005 B1
(45) Date of Patent: Apr. 17, 2001

(54) TAPES FOR HEAT SEALING SUBSTRATES

(75) Inventor: Kyung H. Moh, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/283,699

(22) Filed: Apr. 1, 1999

(51) Int. Cl.⁷ .............................. A61F 13/02; B32B 7/12; B32B 15/04; D06N 7/02; E04F 15/16
(52) U.S. Cl. .................. 428/343; 428/40.4; 428/41.5
(58) Field of Search ................... 428/40.4, 41.5, 428/343

(56) References Cited

U.S. PATENT DOCUMENTS

| | | |
|---|---|---|
| 3,669,787 | 6/1972 | Cornell . |
| 3,728,185 | 4/1973 | Gray . |
| 3,954,486 | 5/1976 | Francel et al. . |
| 4,058,387 | 11/1977 | Nofziger . |
| 4,120,678 | 10/1978 | Francel et al. . |
| 4,131,478 | 12/1978 | Davis et al. . |
| 4,310,357 | 1/1982 | Matsuura et al. . |
| 4,654,095 | 3/1987 | Steinberg . |
| 4,710,479 | 12/1987 | Yamanaka . |
| 4,883,777 | 11/1989 | Yamanaka . |
| 5,145,803 | 9/1992 | Daimer et al. . |
| 5,179,046 | 1/1993 | Francis et al. . |
| 5,246,890 | 9/1993 | Aitken et al. . |
| 5,280,061 | 1/1994 | Haraguchi et al. . |
| 5,516,733 | 5/1996 | Morena . |
| 5,539,151 | 7/1996 | Hamzehdoost et al. . |
| 5,700,744 | 12/1997 | Park et al. . |
| 5,747,931 * | 5/1998 | Riddle et al. ................... 313/581 |
| 5,795,520 | 8/1998 | Scalia et al. . |
| 5,800,154 | 9/1998 | Watkins . |

FOREIGN PATENT DOCUMENTS

| | | |
|---|---|---|
| 0 498 409 | 8/1992 | (EP) . |
| 0 893 813 A2 | 1/1999 | (EP) . |

OTHER PUBLICATIONS

Patent Abstracts of Japan, vol. 12, No. 351, Sep. 20, 1998, Japanese Pat. No. 63 108754.

"A Test Method to Measure Shear Strength of Ceramic Jounts at High Temperatures" Unal et al.; *Am. Ceram. Soc.*, vol. 80, No. 5, 1997, pp. 1281–1284.

"Solder glass seals in semi-conductor packagin", D.W.A. Forbes, *Glass Technology*, vol. 8, No. 2, Apr. 1967, pp. 32–42.

"Tape Casting Reactive Aluminas", Anderson et al., *The American Ceramic Society Bulletin*, vol. 76, No. 7, Jul. 1997, pp. 45–50.

"Standard Test Method for Softening Point of Glass", *ASTM C 338–93*, pp. 101–103.

"Standard Test Method for Assignment of the Glass Transition Temperature by Thermomechanical Analysis", *ASTM E 1545 –95a*, pp. 937–940.

* cited by examiner

Primary Examiner—Patrick D. Niland
(74) Attorney, Agent, or Firm—Scott R. Pribnow

(57) ABSTRACT

A tape for heat sealing substrates comprising a self-supporting layer of glass sealant wherein the glass sealant layer comprises a low-softening point glass, a plurality of refractory particles, a dispersant, and a binder. Also described is a method for making the tape and a method of using the tape to form a sealed article.

32 Claims, 2 Drawing Sheets

TAPES FOR HEAT SEALING SUBSTRATES

TECHNICAL FIELD

The present invention relates to sealing tapes for heat-sealing substrates, methods of making the same, and methods of using the same to form a sealed article.

BACKGROUND

Glass sealants are used, in part, in making electronic parts such as semiconductor devices and fluorescent character display tubes. For example, U.S. Pat. No. 5,145,803 (Daimer et al.) reports a glass sealant comprising a lead borate glass used in the fabrication of integrated circuits. U.S. Pat. No. 4,883,777 (Yamanaka) reports a lead-containing glass sealant for the manufacture of semiconductors and other electronic devices. U.S. Pat. No. 4,058,387 (Nofziger) and U.S. Pat. No. 4,120,678 (Francel et al.) report a glass sealant used to seal a glass faceplate to a glass funnel of a cathode-ray tube. Glass sealants form a bond between two substrates when heated and when used on electronic devices are preferably made of low-softening point glass to avoid damage to the article being sealed. Some low-softening point glass sealants melt and flow at a temperature below 500° C., and most frequently between 400° C. and 475° C.

Most glass sealants are pastes applied by extrusion so that a continuous amount of paste is placed between two surfaces to be sealed. The fluid nature of the paste makes the application of a very thin and uniform layer of paste free of voids difficult to achieve. Gaps of paste, or uneven paste thickness along the surfaces to be sealed may result in poor substrate bonding. Excess paste, upon heating and cooling of the paste, may result in debris particles being formed external to the region being sealed. These debris particles may come loose and damage the internal components of the article being manufactured.

Pastes are soft, smooth, and thick mixtures that when used are messy. Pastes are easily transferred to other parts of the articles being manufactured, to technicians operating equipment, to equipment used in the manufacturing process, and to other work areas. Pastes may accidentally be applied to clothing or to skin creating a potential safety hazard depending upon the composition of the pastes. Furthermore, pastes may contain volatile solvents which emit unpleasant and possibly hazardous odors. Pastes may also have a short shelf life since the volatile solvent in the paste may evaporate leaving a dried material which cannot be applied to a substrate. As a result of this, often times a large percentage of paste is discarded as waste.

In addition to the foregoing, pastes may contain lead which is hazardous to workers when the lead-containing paste contacts skin or is ingested. Lead containing glass sealants must be disposed of properly to avoid environmental issues. Additional clean-up time may be necessary to remove unwanted paste.

SUMMARY

The present invention provides tapes made of glass sealants for heat sealing substrates. The tapes of the present invention comprise a self-supporting layer of glass sealant including a low-softening point glass, refractory particles, a dispersant, and a binder. These tapes can easily be applied to substrates without the mess associated with pastes. The tapes minimizes gap formation between two or more substrates being bonded and provide a layer of glass sealant having a uniform thickness. The thickness of the tape can be easily controlled and very thin tapes can be achieved.

In a preferred embodiment, the tape includes at least one adhesive layer attached to a major surface of the tape. The adhesive aids in holding the substrates in place during the early stages of the sealing process.

The present invention also provides a method of making tapes of glass sealants for heat sealing substrates. The method comprises the steps of mixing a low-softening point glass, a carrier, a dispersant, and refractory particles to form a slurry; adding a binder to the slurry to form a glass sealant; deaerating the slurry; and forming the slurry into a self-supporting layer.

The present invention also provides a method of making a sealed article using a tape of the present invention. The method comprises the steps of:

(i) placing a tape for heat sealing substrates in contact with a first substrate, the tape comprising a self-supporting layer of a glass sealant including a low-softening point glass, refractory particles, a dispersant, and a binder;

(ii) placing a second substrate in contact with the tape so that the tape is at least partially located between the first substrate and the second substrate thus forming an assembly in which the glass sealing tape is at least partially interposed between the first and the second substrates;

(iii) heating the assembly to a temperature capable of melting the glass sealant;

(iv) at least partially melting the glass sealant; and (v) cooling the assembly so that the melted glass sealant hardens.

As used herein, with respect to the present invention, the following shall apply:

"Ceramic" refers to an inorganic, nonmetallic material, such as metal oxides, metal nitrides, and metal oxynitrides, preferably consolidated by the action of heat.

"Fired" refers to densification or consolidation by action of heat.

"Green Tape" refers to compositions having both inorganic and organic components, which have a definite shape, and which may be fired to produce a ceramic.

"Refractory" refers to a material that maintains its structural integrity at temperatures at least up to about 1000° C.

"Joint" refers to the seal and/or bond created by the tapes of the present invention located between the substrates which are bonded together by these tapes.

"Self-supporting" refers to a green body having sufficient mechanical integrity to be dispensed from a roll without breaking or significant disruption of the tape. For example, approximately one half inch of tape may overhang an edge without tearing.

"Fiber Softening Point" refers to the measurement obtained for a glass using the Standard Test Method for Softening Point of Glass, ASTM Designation No.: C 338-93.

"Low softening point glass" refers to a glass composition capable of viscous flow at temperatures in the range of about 280° C. to 500° C.

DETAILED DESCRIPTION

Figure 1:
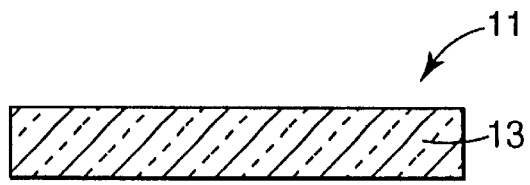
FIG. 1 is a cross sectional view of a tape of the present invention comprising a self-supporting layer of glass sealant.
Figure 2:
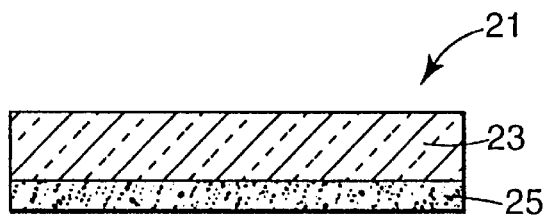
FIG. 2 is a cross sectional view of a tape of the present invention comprising a self-supporting layer of glass sealant and an adhesive.
Figure 3:
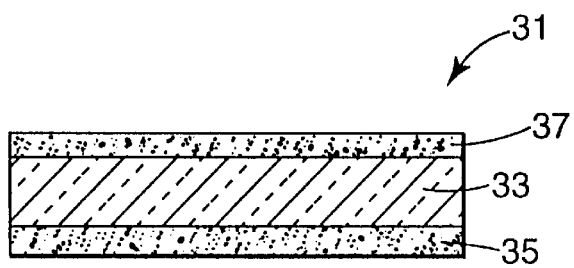
FIG. 3 is a cross sectional view of a tape of the present invention comprising a self-supporting layer of glass sealant and two adhesive layers.
Figure 4:
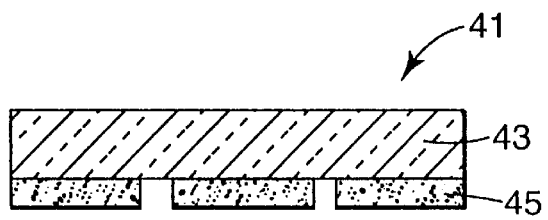
FIG. 4 is a cross sectional view of a tape of the present invention comprising a self-supporting layer of glass sealant and a non-continuous layer of adhesive.

The present invention provides tapes made of glass sealant used for heat sealing two or more substrates together. Such substrates include, in part, glass, refractories, or metals. The preferred substrate is glass, especially glass that is used to make cathode ray tube face plates and funnels. A tape is placed between a cathode ray tube faceplate and a funnel or any other substrates to be sealed and/or bonded. This assembly of tape and substrates is heated to the melting temperature of low softening point glass. The assembly is maintained at this temperature until the low-softening point glass is at least partially melted. Upon cooling, a joint is formed between the two substrates to be sealed. The joint forms a seal that prevents leakage between the two objects joined. The joint also bonds the two substrates acting as an agent that causes two or more objects or parts to cohere. For purposes of producing a stronger bond with less leakage, it is preferred that the low-softening point glass be completely melted. The bond strength of the joint is determined by a four-point method well known in the art. The bond strength of the joint is within the range of 0.1 MPa to 4.0 MPa Referring to FIG. 1, an embodiment of a tape 11 of the present invention comprises a self-supporting layer of glass sealant 13. The glass sealant 13 includes a low-softening point glass, a plurality of refractory particles, a dispersant, and a binder. After being mixed, these components, upon drying, form a green body or a ceramic composition that includes both inorganic and organic components. The green body is a self-supporting layer of glass sealant that may be further modified by coating one or more of the surfaces of the self-supporting layer with an adhesive layer. As illustrated in FIG. 2, a tape 21 comprises a self-supporting layer of glass sealant 23 and a layer of adhesive 25. The adhesive layer will allow the self-supporting layer of glass sealant to adhere well to a substrate to be sealed. As illustrated in FIG. 3, a tape 31 may be constructed that includes a self-supporting layer of glass sealant 33 between two adhesive layers 35 and 37. This tape may also help to hold substrates in place before heat sealing. If a tape comprises two adhesive layers, each may comprise the same adhesive or different adhesives. As illustrated in FIG. 4, a tape 41 may include a self-supporting layer of glass sealant 43 and a non-continuous layer of adhesive 45.

At the elevated temperatures used to heat seal substrates, organic constituents burn-off and may become trapped in the glass of the melted tape. Trapped carbon increases the void volume of the melted glass and reduces the strength of the resulting bond. Organic component(s) of the tape of the present invention are released early when burned off by heat such that minimal void volume is generated in the joint.

The tapes of the present invention are made from a slurry comprising a low-softening point glass powder or frit, a carrier, a dispersant, a binder, and a plurality of refractory particles. The low-softening point glass powder or frit may be purchased commercially or formed independently from a wide variety of glass materials. Glass materials include, in part, silicon oxide, silicon phosphate, phosphorus pentoxide, or combinations thereof. The softening temperature of these glass materials may be modified by the addition of mono- and multi-valent ions. Suitable sources of mono- and multi-valent ions for use in the present invention include one or more metal oxides of Si, Al, Fe, K, Mg, Ti, P, Ca, Na, Mn, B, Ge, Zn, Sn, Ba, Bi, Cu, Li, or combinations thereof. Lead, Pb, may also be a component of the low-softening point glass but is less preferred than the other metal ions mentioned. Monovalent or some divalent ions disrupt the lattice structure thereby decreasing the softening point of the glassy material.

It is particularly preferred that the low-softening point glass be substantially free of any of the following heavy metal atoms: Pb, Cd, As, Hg, Co, and Cr(VI). By using oxides of SnO and $Li_2O$, in combination with a particular glass forming composition, the present invention advantageously achieves the formation of glass materials with low-softening points. The incorporation of various amounts of oxides of Sn, Zn, and Li into a glass composition is particularly useful for controlling the respective softening points. For example, using greater amounts of SnO, ZnO, and/or $Li_2O$, in combination with a glass forming composition, tends to lower the softening point of that particular glass forming composition. Mixing $P_2O_5$ with a glass composition generally tends to mechanically strengthen the glass.

One suitable low-softening point glass for use in the practice of the present invention may comprise, on a theoretical oxide basis, in the range from about 20 to about 60 percent by weight SnO, in the range from about 5 to about 35 percent by weight ZnO, and in the range from about 30 to about 45 percent by weight $P_2O_5$, based on the total weight of glass material. Another suitable low-softening point glass may comprise, on a theoretical oxide basis, in the range from about 20 to about 37 percent by weight SnO, in the range from about 24 to about 35 percent by weight ZnO, and in the range from about 39 to about 44 percent by weight $P_2O_5$, based on the total weight of the glass material. The preferred glass materials may also include up to about 4 percent by weight of $Li_2O$. A suitable non-lead, low-softening point glass for a tape of the present invention is reported in U.S. Pat. No. 5,246,890 (Aitken et al.), the disclosure of which is incorporated herein by reference.

As mentioned, the tapes of the present invention are made from slurries, which include refractory particles. Refractory particles are materials, or combination of materials, that maintain their structural integrity at temperatures of at least up to about 1000° C. Suitable refractory particles include, for example, particles of silicon carbide, titanium carbide, zirconium carbide, graphite, alumina, zirconia, zircon, mullite, titania, metal (e.g., platinum, rhodium, and the like), combinations of these, and the like. Non metals are preferred where the joint should be electrically insulating. Refractory particles suitable for the practice of the present invention may provide a wide range of particle sizes and shapes with beneficial results. The refractory particles may also be fibers. For aesthetic purposes, refractory particles may be chosen that provide a particular color.

Glass sealants of the present invention include refractory particles for a number of reasons. For example, characteristics such as the thermal expansion and the shrinkage of the glass sealant used to form a joint maybe modified by the addition of refractory particles to a glass sealant. The melt viscosity of the glass sealant may also be modified by the addition of refractory particles. Refractory particles influence the crystallization of glass upon the melted glass sealant cooling. Further, refractory particles may also provide some degree of mechanical support while the low melting point glass is in a softened state.

In the preferred embodiments, the refractory particles of the tape provide a loose framework which supports and determines the shape of the tape when it is above the melting point of the glass. The melted low-softening point glass fills the void volume within the refractory framework. If the volume of the melted low-softening point glass is significantly lower than the available void volume, the glass may not flow sufficiently well from the composite to wet the substrate at the application temperature. If the volume of the melted low-softening point glass is significantly greater than the available void volume, the tape may not retain the desired degree of dimensional integrity during the application process. The available void volume is expected to depend on the prefiring size distribution associated with the refractory particles and the shape or shapes associated with the particles. For example, uniform, highly acicular needles are expected to pack less efficiently than a broadly distributed population of spherical particles. Useful ranges of the ratio of low melting point glass to refractory phase volume within the tape are from about 1.2:1 to about 3.0:1. The weight percentage of refractory particles in a tape after firing is in the range of 4.7 percent to 33.3 percent for most tape applications.

Typically, refractory particles have a normal particle size distribution. As an option, however, refractory particles having bimodal or other multimodal size distributions could be used, if desired. For example, the appropriate selection of a combination of two or more particle size distributions may help refractory particles to further increase the viscosity of the low-softening point glass and/or to prevent excessive flow at the application temperature as compared to particles having only a normal or log normal size distribution. Increased viscosity may also help to maintain the structural and dimensional integrity of the tape without significantly limiting its conformability. Accordingly, in applications in which it is desirable to further increase the viscosity of the low-softening point glass, at least a portion, preferably 5 to 10 weight percent, of refractory particles may include an amount of finely divided refractory particles (i.e., refractory particles have an average particle size of less than 1 micrometer, preferably 0.5 to 1 micrometer) effective to substantially prevent undesired flow of the low-softening point glass. Particle size as used herein refers to the longest dimension of a particle, and can be measured by any convenient technique. For particles up to about 100 micrometers in size, a "Coulter Counter, Model TA3" particle size analyzer, available from Coulter Corp., Hialeah, Fla., can be used.

Volatile Liquid Carrier

Slurries used to make the tapes of the present invention are made by mixing low-softening point glass particles with refractory particles to form a mixture. An optional volatile liquid carrier may be added to the low softening point glass particles/refractory particle mixture to form a suspension. The volatile liquid carrier is then easily removed from the mixture by evaporation. The preferred carrier is a non-aqueous liquid such as dichloromethane, trichloroethane, methyl ethyl ketone, toluene, ethyl alcohol, or a combination thereof. Water may be used, as the carrier, but is less preferred than non-aqueous liquids. Preferably, a slurry includes from about 40 to about 70 percent by volume of the carrier, based upon the total volume of the slurry ingredients. Carriers preferably evaporate resulting in the formation of a self-supporting layer of glass sealant, consequently, the self-supporting layer of glass sealants is substantially free of carrier.

Dispersants

Slurries used to make tapes of the present invention include at least one dispersant. A dispersant is a material that increases the stability of a suspension of particles in a liquid medium by deflocculation of the primary particles. In the present invention, the dispersant is preferably added to a mixture comprising low softening point glass particles, refractory particles and a volatile liquid carrier. The dispersant reduces the viscosity of the mixture, causes the deflocculation of the glass and the refractory particles, and allows for better mixing of the components of the mixture. Representative examples of commercially available dispersants include a sodium salt of a carboxylate polyelectrolyte dispersant (available, for example, under the trade designation "TAMOL 731", available from Rohm & Haas Co., Philadelphia, Pa.). Another useful dispersant having defoaming characteristics is an acetylene alcohol (available, for example, under the trade designation "SURFYNOL 104E", available from Air Products Co., Allentown, Pa.). The dispersant may also be the binder of a tape of the present invention if the binder provides the required dispersion characteristics. Upon heating the tape to its melting temperature, the dispersant will either evaporate or burn, possibly releasing carbon. Any retained carbon may decrease the bonding properties of the tape. Consequently, it is preferred that the slurry used to make the tape of the present invention comprise a minimal amount of dispersant.

Binder

Slurries used to make tapes of the present invention also include a binder. A binder is an organic material suitable for forming a self-supporting layer when the slurry is dried. Suitable polymeric binders include acrylic polymers, polyvinyl butyral, polyvinyl alcohol, polyurethanes, polyesters, mixtures thereof, and the like, and may be selected depending on the carrier being used in accordance with conventional practices. The weight ratio of polymeric binder to total weight of glass frit and refractory particles is typically in the range from about 1:9 to about 1:15. The binder is removed when the tape of the present invention is placed under temperature conditions sufficient to melt the glass components of the tape. Upon heating the tape to its melting temperature, the binder will burn and may release carbon. Any retained carbon may decrease the bonding properties of the tape and may contribute undesirable porosity and/or electrical conductivity.

Slurries used to make tapes of the present invention may include a plasticizer depending upon the characteristics of the binder selected as a component of a slurry. A tape prepared from a slurry including a binder having a high glass transition temperature will tend to form an inflexible self-supporting layer of glass sealant. A plasticizer will preferably be added to this slurry to make the resulting self-supporting layer of glass sealant more flexible. If a slurry includes an inherently flexible binder, then a plasticizer may not be a necessary component of the slurry since the resulting self-supporting layer of glass sealant would inherently be flexible. The plasticizer is removed by burn-off when the self-supporting layer of glass sealant is heated to its softening point. Plasticizers typically tend to evaporate from the self-supporting layer of glass sealant before they decompose or burn-off.

Adhesive

After the components of the slurry are mixed, the slurry is formed into a layer and dried. A self-supporting layer of glass sealant is formed. One or more adhesive layers may be attached to the self-supporting layer of glass sealant as illustrated in FIGS. 2, 3, and 4. The adhesive layer(s) may be pressure sensitive or they may be hot melt type adhesives. Suitable adhesives include, for example, acrylates, urethanes, tackified rubbers, and silicones. Other like adhesives known to one skilled in the art may also be used. The adhesive layer(s) may be continuous (i.e., coextensive with a major surface of the tape) or discontinuous. Discontinuous adhesive layers may be coated in a pattern, for example, stripes or dots. The adhesive layer is preferably burned off when the tape comprising the self-supporting layer of glass sealant and adhesive layers are heated to the softening point of the glass sealant.

Method of Making Glass Sealing Tapes

The following components: a low-softening point glass, a carrier, a dispersant, a binder, and a plurality of refractory particles are combined in a mixing apparatus to form slurry. The low softening point glass and the refractory particles are combined first and then a volatile liquid carrier may be added to the glass/particle mixture to form a suspension. A dispersant is then added to the suspension to reduce its viscosity. The mixing apparatus is able to reduce the size of the refractory particles and/or glass frit by a suitable size reducing technique known in the art such as crushing, wet ball milling, dry ball milling, jet milling, and the like. If dry milling is used, then the volatile liquid component is added after the particle size reduction of the glass and refractory particles. The slurry is then mixed for about one to about twelve hours, preferably for about one hour. Next, an organic binder precursor and any desired optional additives (e.g., a plasticizer or colorant) are added to the slurry and are allowed to mix (preferably ball milled) for about 4 to 12 hours. The slurry is then deaerated, preferably by transferring the slurry to a plastic bottle and rotating the slurry within the bottle slowly (about 1 to about 5 rpm) to remove air bubbles from the slurry before casting. The slurry may also be dearated under a vacuum, for example, by use of an aspirator or vacuum pump, prior to forming the slurry into the shape of a tape. A suitable vacuum is about 1 torr.

The preferably deaerated slurry is formed into the desired shape (e.g., a sheet) using conventional techniques such as tape casting, slip casting, screen printing, gravure coating, knife coating, and the like. The preferred method for shaping the slurry is tape casting. Tape casting is a conventional method that utilizes a doctor blade or knife blade to coat the slurry onto a release liner. To accomplish tape casting, the viscosity of the slurry is preferably in the range from about 2,000 to 2,900 cps (measured under ambient conditions using a Brookfield viscometer fitted with a No. 3 spindle at 100 rpm). If the viscosity of the slurry is too low after milling, the viscosity can be increased by removal of a portion of the carrier prior to tape casting. Typically, carrier is removed from the slurry by evaporation following the casting step.

Typically, a sheet is first cast onto a carrier support (liner or backing), then carefully dried to produce an uncracked, unwarped tape. Examples of suitable carrier supports include paper, silicone coated paper, polymeric films, or combinations thereof. The preferred carrier support is a silicone coated polyester film. Drying can be accomplished using any of several conventional liquid media removal techniques including heating. Preferably, the tapes are dried in air at room temperature or are heated in air at a temperature ranging from about 30 C. to about 50° C. The tapes may be stripped from the carrier support or, optionally, the carrier support may be left on the tape to improve its handling properties. The thickness of the tape typically ranges from about 0.1 to about 2 millimeters, preferably ranging from about 0.1 to about 0.5 millimeters. Optionally, one or more adhesive layers may be attached to the self-supporting layer of glass sealant.

The tape is then placed between the surfaces of the substrates to be sealed by the tape to form a sandwich assembly. The sandwich assembly is then heated to a temperature in the range of about 350° C. to about 500° C. so that the tape melts but not the substrates. The sandwich assembly is preferably heated from room temperature to the desired maximum firing temperature under conditions effective to burn out organic constituents without causing the sandwich assembly to suffer from undue thermally induced damage. The preferred heating rate is dependent upon a variety of factors including the atmosphere in which the sandwich assembly is heated, and the amount and type of organic constituent present. Preferably, the heating rate is slow enough to avoid cracking, bloating, undue shrinkage, or distortion of the sandwich assembly during firing. The heating should also occur at a rate slow enough to prevent carbon trapping in the tape. Alternatively, the sandwich assembly may be heated wherein the temperature (beginning at room temperature) is incrementally raised to, and held at, a temperature sufficient to evaporate or burn out the organic constituents before reaching the softening point of the glass to prevent trapping of the organic constituents (e.g., carbon). Following removal of the organic constituents, heating is resumed until the melting point of the low softening point glass is reached. The sample is then cooled to form a joint between the substrates being bonded together. This stepwise rise in temperature aids in more complete removal of organic components prior to melting the glass which will result in fewer carbon inclusions or voids in the joint.

Glass Sealing Tape

The tapes of the present invention preferably have a self-supporting layer of glass sealant with a thickness in the range of about 0.1 to about 2 millimeters, preferably having a thickness in the range of about 0.1 to about 0.5 millimeters. The width of the self-supporting layer of glass sealant is preferably in the range of about 2 millimeters to about 5 centimeters; however, it is most preferred that has a width which is approximately the width of the joint to be sealed. In one embodiment, a tape of the present invention may be provided in the form of a pre-cut gasket having the desired shape to form a seal between two substrates. For example, a gasket having a rectangular outer shape and an open center portion may be used to provide a peripheral seal between two rectangular plates of a plasma display panel.

Figure 5:
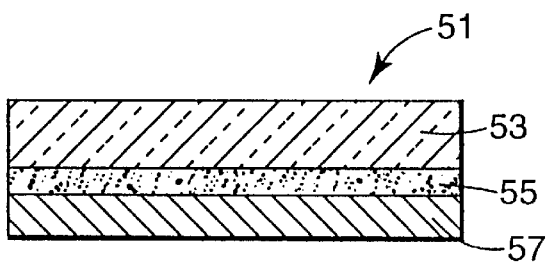
FIG. 5 is a cross sectional view of a tape of the present invention comprising a self-supporting layer of glass sealant, an adhesive layer, and a backing.

The tape may also contain additional layers such as one or more adhesive layer(s). The adhesive layers may comprise the same, different, or mixture of adhesives. Tapes having an adhesive layer on each of the major surfaces of the self-supporting layer of glass sealant are preferred. In addition, a tape having adhesive layers made of two different compositions may have benefits. For example, one of the adhesive layers may more permanently adhere to a first substrate while the second adhesive layer may be made of a pressure sensitive adhesive having less permanent adherence. A user of the tape could position the second substrate correctly over the tape permanently attached to the first substrate. Examples of tapes having adhesive layers are illustrated in FIGS. 2, 3, 4, and 5. Liners, or backings may be placed over the adhesive layer of the tape and may be removed prior to placing the adhesive in contact with the substrates to be bonded. An embodiment of a tape of the present invention having a backing is illustrated in FIG. 5. In FIG. 5, tape 51 includes self supporting layer of glass sealant 53 and adhesive 55. Adhesive 55 is adhered to a major surface of glass sealant layer 53. Releasably attached to a major surface of adhesive 55 is backing 57. Backing 57 is removed from adhesive 55 prior to placing adhesive 55 in contact with the substrates to be bonded.

For many applications, the adhesive layer(s) may be discontinuous in order to minimize the total organic content of the tape while maintaining the desirable positioning features provided by an adhesive.

Tapes that are substantially free of adhesive layer(s) are preferably wet with a liquid such as ethanol before being applied to a substrate. Wetting the surface of the tape aids the tape in adhering to a substrate surface.

In the preferred embodiments, tapes according to the present invention include substantially no heavy metal atoms selected from Pb, Cd, As, Hg, Co, and Cr(VI). Such heavy metal atoms generally pose environmental and/or health hazard so that avoiding the use of such materials is highly desirable. Providing tapes that are free of these kinds of heavy metal atoms also facilitates recycling, because sealed substrates can be processed for recycling without having to remove the sealed area This would decrease both the expense and the processing steps associated with recycling. Consequently, avoiding such heavy metal atoms is particularly advantageous for industrial applications such as the manufacture of cathode ray tubes, where breakage is known to occur and recycling is regularly practiced.

The joint produced by a tape of the present invention preferably has a coefficient of thermal expansion that is approximately equal to the coefficient of thermal expansion of the substrate bonded. That is, the ratio of the coefficient of thermal expansion of the joint relative to the substrate bonded ranges from about 0.8 to 1.2, more preferably ranging from about 0.9 to 1.1 over a temperature range from about room temperature to about the sealing temperature. In the practice of the present invention, the coefficient of thermal expansion of the tape and or substrates is measured by ASTM E831, "Standard Test Method for Linear Thermal Expansion of Solid Materials by Thermomechanical Analysis" (September 1993), the disclosure of which is incorporated herein by reference. The coefficient of thermal expansion of the glass sealant and the substrates bonded should be similar to avoid residual stress in the joint which may lead to failure of the joint. Cathode ray tube glass typically has a coefficient of thermal expansion in the range from $8 \times 10^{-6}/°$ C. to $12 \times 10^{-6}/°$ C. over a temperature range extending from about 25° C. to 300° C. For cathode ray tube glass having a coefficient of thermal expansion of about $8 \times 10^{-6}/°$ C., it is preferred that the joint formed from a sealing tape of the present invention has a coefficient of thermal expansion in the range from about $6.4 \times 10^{-6}/°$ C. to about $9.6 \times 10^{-6}/°$ C. Similarly, for cathode ray tube glass having a coefficient of thermal expansion of about $12 \times 10^{-6}/°$ C., it is preferred that a joint formed from a tape of the present invention has a coefficient of thermal expansion in the range from $9.6 \times 10^{-6}/°$ C. to $14 \times 10^{-6}/°$ C.

EXAMPLES

The examples below are carried out using standard techniques, which are well known and routine to those skilled in the art, except where otherwise described in detail. The examples are illustrative, but do not limit the invention.

GLOSSARY

ALUM alumina particles having a median particle size of 0.4 micrometers, commercially available under the trade designation "CALCINED ALUMINA ALO" from Alcoa Industrial Chemicals Co., Bauxite, Ariz.

CAR a mixture comprising 66% by volume methylethylketone and 34% by volume ethanol.

DOP dioctyl phthalate commercially available from Aldrich Chemical Co., Milwaukee, Wis.

DPM003 a lead-free glass frit consisting of a tin-zinc-phophate oxide composition, available from Ferro Corporation, Cleveland, Ohio.

DPM1003 a lead-free glass frit consisting of a tin-zinc-phosphate oxide composition available from Ferro Corporation, Cleveland, Ohio.

PE a dispersant commercially available under the trade designation "EMPHOS PS21A" from Witco Corp., New York, N.Y.

PEG methoxy polyethylene glycol commercially available under the trade designation "CARBOWAX 2000" from Union Carbide Co., Danbury, Conn.

PVB polyvinyl butyral commercially available from Aldrich Chemical Co., Milwaukee, Wis.

ZIRC1 zirconia particles having a median particle size of 8.5 micrometers, commercially available from Zirconia Sales, Inc. American Vermiculite Corp., Marietta, Ga.

ZIRC2 zirconia particles having a median particle size of 0.9 micrometers, commercially available from Zirconia Sales, Inc. American Vermiculite Corp., Marietta, Ga.

ZIRC zircon particles having a median particle size of 8.0 micrometers, commercially available as G Zircon Milled Fine from TAM Ceramics, Inc., Niagara Falls, N.Y.

TEST PROCEDURE 1

Figure 6:
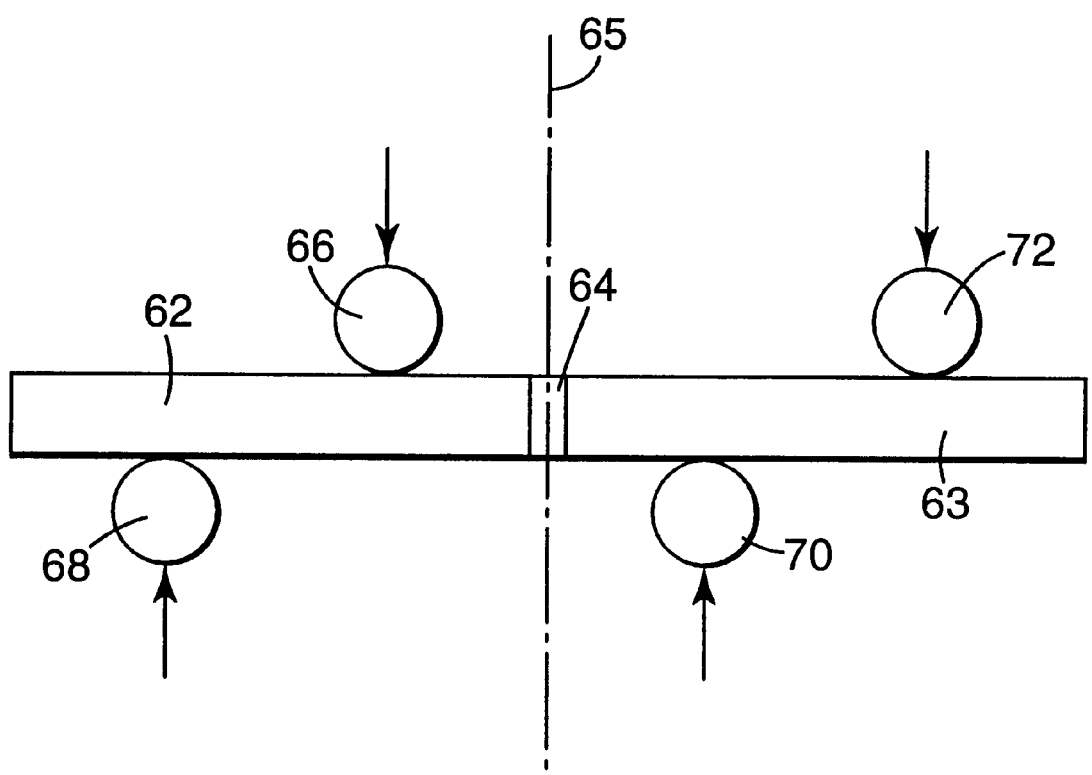
FIG. 6 is a side view of a device used to measure the shear strength of a joint formed by a tape of the present invention.

An asymmetrical four-point shear strength test, which provides a pure shear stress in the middle of the test specimen, was utilized to measure the shear strength of the joint between cathode ray tube glasses (see, *J. Am. Ceram. Soc.*, 80 [5] 1281–84 (1997)). FIG. 6 schematically illustrates the four-point shear strength test for evaluating glass seal joint between Cathode Ray Tube glasses. The test specimen consists of glass bar 62 and glass bar 63 that are bonded to one another by joint 64. Joint 64 is formed using a tape of the present invention. Glass bar 62 is interposed between stainless steel loading pins 66 and 68. Similarly, glass bar 63 is interposed between stainless steel loading pins 70 and 72. Loading pins 66 and 70 are positioned at a distance of 4 mm from the center 65 of joint 64. Loading pins 68 and 72 are positioned at a distance of 12 mm from the center 65 of joint 64. In order to apply a shear force to joint 64, a force is applied to each of the four loading pins in a direction normal to the surface of glass bars 62 and 63 (see arrows in FIG. 6). This results in a shear force across joint 64. Test Procedure 1 was conducted at room temperature using an industrial test machine commercially available under the trade designation "SINTECH 10/D" (available from MTS Systems Corp., Eden Prairie, Minn.).

Examples 1–3

The following tapes for heat sealing substrates were prepared by making a slurry. About 50 grams of glass balls having a diameter of 16 millimeters and about 50 grams of glass balls having a diameter of 12.5 millimeters were placed in a 450 cm$^3$ glass jar having a diameter of about 7.0 centimeters. Both types of glass balls were obtained from Jencors Co., Bridgeville, Pa. The following components were added to the glass jar containing the glass balls: 45 grams of CAR, 0.94 gram of PE, 70 grams of a DPM003 glass frit, and 30 grams of ZIRC1. The mixture was ball milled at a speed of 100 rpm for about an hour.

Next, approximately 8 grams of PVB, 6 grams of PEG, and 8 grams of DOP were added to the mixture. The ingredients were then ball milled for an additional 4 hours (Example 1), 8 hours (Example 2), and 12 hours (Example 3), and a slurry of the glass sealant composition was formed. The composition of each slurry is summarized in Table 1.

Each of the resulting glass sealant slurries were further processed by transfer to a 450 cm³ plastic bottle (commercially available under the trade designation "NALGENE", available from Nalgene, Chicago, Ill.). The glass sealant was slowly rotated at a speed of 1 rpm to remove air bubbles from the glass sealant before casting onto a silicone-coated polyester film. The viscosity of the slurry was 2900 cps (measured using a Brookfield viscometer with a number 3 spindle at 100 rpm). The polyester film was 0.076 millimeter thick and was available under the tradename "WWSIP-75", available from Western Wallis Inc., Manhattan Beach, Calif. The casting was performed using a doctor blade type tape casting machine having a 15 mil (0.38 millimeter) coating gap. The glass sealants were dried overnight at ambient conditions and the resulting self-supporting layers of glass sealants were then stripped from the polyester film to provide green sheets with a thickness of about 150 micrometers. The coefficient of thermal expansion of the sealing material of Example 1 (measured following heating to 300° C. at 10° C./min) was $93.3 \times 10^{-7}/°$ C.

The tapes were used to seal substrates. First the self-supporting sheet of glass sealant was cut into 8.0 centimeters×1.2 centimeters pieces and two self-supporting layers were placed between two cathode ray tube glass (available from Philips Corp., Toledo, Ohio) bars having a size of 8.0 centimeters×1.2 centimeters×1.5 centimeters. The faces of the self-supporting layer was wetted by applying ethanol with a brush. Ethanol was not employed in subsequent examples when self-supporting layers were associated with an adhesive layer. The resulting samples, comprising glass sealing tape located between pieces of cathode ray tube glass, were statically loaded to provide a pressure of about 30 g/cm², and were fired in a conventional resistive furnace in air. The samples were heated from room temperature to 400° C. at 4 C per minute followed by holding at 400° C. for 0.6 hour. The samples were then allowed to cool to room temperature within the furnace to form a joint. The joint was the region located between the glass bars responsible for bonding the bars together.

The samples were then cut into 1.0×1.2×3.0 cm specimens(including joint). The joint was located in the center of each specimen. For each specimen, the shear strength of the joint was measured as described in Test Procedure 1 and the results are listed in Table 1.

Examples 4–6

The self-supporting layer of glass sealant of Examples 4–6 were prepared as Examples 1–3. However, the zirconia added to the slurry was ZIRC2 having a smaller mean particle size of 0.9 micrometers. The milling times were 4 hours (Example 4), 8 hours (Example 5), and 12 hours (Example 6). The composition of the slurries of Examples 4, 5, and 6 are summarized in Table 1. For each specimen, the shear strength of the joint was measured as described in Test Procedure 1 and the results are listed in Table 1.

TABLE 1

|  | Example Number | | | | | |
| --- | --- | --- | --- | --- | --- | --- |
|  | 1 | 2 | 3 | 4 | 5 | 6 |
| DPM003 glass frit | 70 | 70 | 70 | 70 | 70 | 70 |
| ZIRC1 | 30 | 30 | 30 |  |  |  |
| ZIRC2 |  |  |  | 30 | 30 | 30 |
| PE | 0.94 | 0.94 | 0.94 | 0.94 | 0.94 | 0.94 |
| CAR | 45 | 45 | 45 | 45 | 45 | 45 |
| PVB | 8.1 | 8.1 | 8.1 | 8.1 | 8.1 | 8.1 |
| PEG | 6 | 6 | 6 | 6 | 6 | 6 |
| DOP | 8 | 8 | 8 | 8 | 8 | 8 |
| Slurry milling time (hr.) | 4 | 8 | 12 | 4 | 8 | 12 |
| Type of milling media | glass ball | glass ball | glass ball | glass ball | glass ball | glass ball |
| Tape property | conforms | conforms | conforms | conforms | conforms | conforms |
| Surface treatment on tape | wet | wet | wet | wet | wet | wet |
| Thickness of tape (mm) | 0.3 | 0.3 | 0.3 | 0.3 | 0.3 | 0.3 |
| Sealing temperature (° C.) | 400 | 400 | 400 | 400 | 400 | 400 |
| CTE ($10^{-7}/°$ C.) | 93.3 | — | — | — | — | — |
| Stiffness[1] (N/mm) | 4,165 | 3,798 | 2,736 | — | — | — |
| Shear strength (MPa) | 2.14 | 1.95 | 2.82 | <0.01 | <0.01 | <0.01 |

[1]The reported value for stiffness is equal to the slope of the load versus displacement curve determined over the linear portion of the curve.

Table 1 illustrates that greater mechanical shear strength was observed when incorporating larger refractory particles in the glass sealing tape.

Examples 7–12

The self-supporting layer of glass sealant of Examples 7–9 were prepared as Examples 1–3, except that 5.6 grams of PEG and 6.25 grams of DOP were added to the ball mill instead of the previously described quantities. The mixture was then ball milled for 4 hours (Example 7), 8 hours (Example 8), and 12 hours (Example 9). The preparation of the glass sealant of Examples 10–12 were prepared as that of Examples 7–9, except that 20 grams of ZIRC1 were used to make the glass sealant. The ingredients were ball milled for an additional 4 hours (Example 10), 8 hours (Example 11), and 12 hours (Example 12). The compositions of the self-supporting layers of glass sealant of Examples 7–12 are summarized in Table 2.

Four layers of dry tapes with an individual thickness of 150 micrometers were placed between cathode ray tube glass (available from Philips Corp.) bars having a size of 5 cm by 1.2 cm by 1.5 cm. The resulting samples were then fired in a conventional resistive furnace in air according to the following schedule. The furnace temperature was raised at a rate of 4° C./min from room temperature to 450° C. and was held at 450° C. for 0.6 hour. The fired samples were cut into smaller pieces of specimens sized 1.0 cm by 1.2 cm by 3.0 cm. For each specimen, the shear strength of the joint was measured as described in Test Procedure 1 and the results are listed in Table 2.

"Standard Test Method for Linear Thermal Expansion of Solid Materials by Thermomechanical Analysis"(September 1993).

Two layers of these green tapes were placed in between two cathode ray tube glass (available from Philips Corp.) bars having a size of 6.0 cm by 1.2 cm by 1.5 cm after first wetting the faces of the tape with ethanol applied using a brush. The resulting samples of glass sealing tape located between cathode ray tube glasses were then fired with a

TABLE 2

| | Example Number | | | | | |
|---|---|---|---|---|---|---|
| | 7 | 8 | 9 | 10 | 11 | 12 |
| DPM003 glass frit | 70 | 70 | 70 | 80 | 80 | 80 |
| ZIRC1 | 30 | 30 | 30 | 20 | 20 | 20 |
| PE | 0.94 | 0.94 | 0.94 | 0.94 | 0.94 | 0.94 |
| CAR | 45 | 45 | 45 | 45 | 45 | 45 |
| PVB | 8.1 | 8.1 | 8.1 | 8.1 | 8.1 | 8.1 |
| PEG | 5.6 | 5.6 | 5.6 | 5.6 | 5.6 | 5.6 |
| DOP | 6.25 | 6.25 | 6.25 | 6.25 | 6.25 | 6.25 |
| Slurry milling time (hr.) | 4 | 8 | 12 | 4 | 8 | 12 |
| Type of milling media | glass ball | glass ball | glass ball | glass ball | glass ball | glass ball |
| Tape property | brittle | brittle | brittle | brittle | brittle | brittle |
| Surface treatment on tape | dry | dry | dry | dry | dry | dry |
| Thickness of tape (mm) | 0.6 | 0.6 | 0.6 | 0.6 | 0.6 | 0.6 |
| Sealing temperature (° C.) | 450 | 450 | 450 | 450 | 450 | 450 |
| Stiffness[1] (N/mm) | 1,833 | 4,816 | 1,454 | 1,550 | 1,849 | 1,352 |
| Shear strength (MPa) | 0.5 | 1.38 | 0.23 | 0.17 | 0.21 | 0.2 |

[1]The reported value for stiffness is equal to the slope of the load versus displacement curve determined over the linear portion of the curve.

Examples 13–18

The glass sealants of Examples 13–18 were prepared as Examples 1–6, with the following changes. The glass sealant of Examples 13–15 were prepared using 30 grams of ZIRC particles as the refractory particles and the glass sealants of Examples 16–18 were prepared using 20 grams of ZIRC particles as the refractory particles. The compositions of the self-supporting layer of glass sealants of Examples 13–18 are summarized in Table 3. The coefficients of thermal expansion of the fired sealing materials of Examples 13, 15, and 16 were $85.5 \times 10^{-7}/°$ C., $82.3 \times 10^{-7}/°$ C. and $125.1 \times 10^{-7}/°$ C., respectively as measured according to ASTM E831, pressure of 30 g/cm$^2$ in a conventional resistive furnace in air according to the following schedule. The furnace temperature was raised from room temperature to 400° C. at 4° C./min.; and then held at 400° C. for 0.6 hour. The samples were allowed to cool at room temperature allowing the formation of seal joints.

The fired samples were cut into smaller pieces of approximately 1.0 cm by 1.2 cm by 3.0 cm. For each specimen, the strength of the joint was measured as described in Test Procedure 1 and the results are listed in Table 3.

TABLE 3

| | Example Number | | | | | |
|---|---|---|---|---|---|---|
| | 13 | 14 | 15 | 16 | 17 | 18 |
| DPM003 glass frit | 70 | 70 | 70 | 80 | 80 | 80 |
| ZIRC | 30 | 30 | 30 | 20 | 20 | 20 |
| PE | 0.94 | 0.94 | 0.94 | 0.94 | 0.94 | 0.94 |
| CAR | 45 | 45 | 45 | 45 | 45 | 45 |
| PVB | 8.1 | 8.1 | 8.1 | 8.1 | 8.1 | 8.1 |
| PEG | 6 | 6 | 6 | 6 | 6 | 6 |
| DOP | 8 | 8 | 8 | 8 | 8 | 8 |
| Slurry milling time (hr.) | 4 | 8 | 12 | 4 | 8 | 12 |
| Type of milling media | glass ball | glass ball | glass ball | glass ball | glass ball | glass ball |
| Tape property | conforms | conforms | conforms | conforms | conforms | conforms |
| Surface treatment on tape | wet | wet | wet | wet | wet | wet |
| Thickness of tape (mm) | 0.3 | 0.3 | 0.3 | 0.3 | 0.3 | 0.3 |
| Pressure on sample (g/cm$^2$) | 30 | 30 | 30 | 30 | 30 | 30 |
| Sealing temperature (° C.) | 400 | 400 | 400 | 400 | 400 | 400 |
| CTE (10$^{-7}$/° C.) | 85.5 | | 82.3 | 125.1 | | |

TABLE 3-continued

| | Example Number | | | | | |
|---|---|---|---|---|---|---|
| | 13 | 14 | 15 | 16 | 17 | 18 |
| Stiffness[1] (N/mm) | 7,741 | 2,999 | 2,249 | 1,865 | 4,392 | 3,906 |
| Shear strength (MPa) | 3.64 | 1.33 | 2.11 | 1.32 | 2.21 | 2.31 |

[1]The reported value for stiffness is equal to the slope of the load versus displacement curve determined over the linear portion of the curve.

Examples 19–24

The glass sealants of Examples 19, 20, and 21 were prepared as Examples 1, 2, and 6, respectively. The glass sealants of Examples 22–24 were prepared as Example 13. The self-supporting layers were approximately 300 micrometers thick and the top and bottom surfaces were coated with a 40 micrometers thick pressure sensitive adhesive (Scotch Adhesive Transfer Tape #924, available from Minnesota Mining and Manufacturing Company, St. Paul, Minn.). The compositions of the self-supporting layers of glass sealant of Examples 19–24 are illustrated in Table 4. The tapes were placed between two pieces of cathode ray tube glass (available from Philips Corp.). The adhesive served to position the self-supporting layer of glass sealant and to assist the alignment of the glass pieces during the early stages of the sealing process. Each cathode ray tube glass piece had a size of 6.0 cm by 1.2 cm by 1.5 cm. The resulting samples were fired in the same manner as previous examples at 400° C. For each specimen, the shear strength of the joint was measured as described in Test Procedure 1 and the results are listed in Table 4.

Examples 25–30

Self-supporting layers of glass sealants of Examples 25–27 were prepared as Examples 13–15, except that the thickness of the glass sealing tape was 0.15 millimeter. Sealed articles were prepared by the method described under Examples 13–15.

The glass sealants of Examples 28–30 were prepared as follows. First, a 1,000 cm$^3$ porcelain ball mill jar with a diameter of about 13.0 centimeters was charged with about 400 grams of alumina grinding media (1.5 centimeters diameter) and the ingredients of Example 13. A self-supporting layer of each glass sealant was prepared by tape casting. Processing and testing were performed as in Example 13, except that the thickness of the glass sealing tape used was 0.15 millimeter. For each specimen, the shear strength of the joint was measured as described in Test Procedure 1 and the results are listed in Table 5.

TABLE 4

| | Example Number | | | | | |
|---|---|---|---|---|---|---|
| | 19 | 20 | 21 | 22 | 23 | 24 |
| DPM003 glass frit | 70 | 70 | 80 | 70 | 70 | 70 |
| ZIRC1 | 30 | 30 | | | | |
| ZIRC | | | 20 | 30 | 30 | 30 |
| PE | 0.94 | 0.94 | 0.94 | 0.94 | 0.94 | 0.94 |
| CAR | 45 | 45 | 45 | 45 | 45 | 45 |
| PVB | 8.1 | 8.1 | 8.1 | 8.1 | 8.1 | 8.1 |
| PEG | 6 | 6 | 6 | 6 | 6 | 6 |
| DOP | 8 | 8 | 8 | 8 | 8 | 8 |
| Slurry milling time (hr.) | 4 | 12 | 4 | 4 | 8 | 12 |
| Type of milling media | glass ball | glass ball | glass ball | glass ball | glass ball | glass ball |
| Tape property | conforms | conforms | conforms | conforms | conforms | conforms |
| Surface treatment on tape | PSA | PSA | PSA | PSA | PSA | PSA |
| Thickness of tape (mm) | 0.3 | 0.3 | 0.3 | 0.3 | 0.3 | 0.3 |
| Pressure on sample (g/cm$^2$) | 30 | 30 | 30 | 30 | 30 | 30 |
| Sealing temperature (° C.) | 400 | 400 | 400 | 400 | 400 | 400 |
| Stiffness[1] (N/mm) | 2,010 | 1,373 | 3,323 | 2,340 | 2,166 | 1,289 |
| Shear strength (MPa) | 0.34 | 0.2 | 2.36 | 2.32 | 1.12 | 0.17 |

[1]The reported value for stiffness is equal to the slope of the load versus displacement curve determined over the linear portion of the curve.

TABLE 5

| | Example Number | | | | | |
|---|---|---|---|---|---|---|
| | 25 | 26 | 27 | 28 | 29 | 30 |
| DPM003 glass frit | 70 | 70 | 70 | 70 | 70 | 70 |
| ZIRC | 30 | 30 | 30 | 30 | 30 | 30 |
| PE | 0.94 | 0.94 | 0.94 | 0.94 | 0.94 | 0.94 |
| CAR | 45 | 45 | 45 | 45 | 45 | 45 |
| PVB | 8.1 | 8.1 | 8.1 | 8.1 | 8.1 | 8.1 |
| PEG | 6 | 6 | 6 | 6 | 6 | 6 |
| DOP | 8 | 8 | 8 | 8 | 8 | 8 |
| Slurry milling time (hr.) | 4 | 8 | 12 | 4 | 8 | 12 |
| Type of milling media | glass ball | glass ball | glass ball | alumina ball | alumina ball | alumina ball |
| Tape property | conforms | conforms | conforms | conforms | conforms | conforms |
| Surface treatment on tape | wet | wet | wet | wet | wet | wet |
| Thickness of tape (mm) | 0.15 | 0.15 | 0.15 | 0.15 | 0.15 | 0.15 |
| Pressure on sample (g/cm$^2$) | 30 | 30 | 30 | 30 | 30 | 30 |
| Sealing temperature (° C.) | 400 | 400 | 400 | 400 | 400 | 400 |
| Stiffness[1] (N/mm) | 1,624 | 3,433 | 2,278 | 4,054 | 7,287 | 7,250 |
| Shear strength (MPa) | 0.62 | 1.42 | 0.76 | 2.39 | 3 | 2.94 |

[1]The reported value for stiffness is equal to the slope of the load versus displacement curve determined over the linear portion of the curve.

Examples 31–36

Examples 31–33 were prepared and tested as in Examples 28–30, except that 0.30 millimeter glass sealing tape was used. Examples 34–36 were prepared as in Examples 1–3 except that 30 grams of ALUM particles was substituted for the ZIRC. For each specimen, the shear strength of the joint was measured as described in Test Procedure 1 and the results are listed in Table 6.

Examples 37–42

Examples 37–42 were prepared the same as in Examples 13–18, except that a sealing temperature of 430° C. was used to prepare the samples for shear strength testing. For each specimen, the shear strength of the joint was measured as described in Test Procedure 1 and the results are listed in Table 7.

TABLE 6

| | Example Number | | | | | |
|---|---|---|---|---|---|---|
| | 31 | 32 | 33 | 34 | 35 | 36 |
| DPM003 glass frit | 70 | 70 | 70 | 70 | 70 | 70 |
| ZIRC | 30 | 30 | 30 | | | |
| ALUM | | | | 30 | 30 | 30 |
| PB | 0.94 | 0.94 | 0.94 | 0.94 | 0.94 | 0.94 |
| CAR | 45 | 45 | 45 | 45 | 45 | 45 |
| PVB | 8.1 | 8.1 | 8.1 | 8.1 | 8.1 | 8.1 |
| PEO | 6 | 6 | 6 | 6 | 6 | 6 |
| DOP | 8 | 8 | 8 | 8 | 8 | 8 |
| Slurry milling time (hr.) | 4 | 8 | 12 | 4 | 8 | 12 |
| Type of milling media | alumina ball | alumina ball | alumina ball | glass ball | glass ball | glass ball |
| Tape property | conforms | conforms | conforms | conforms | conforms | conforms |
| Surface treatment on tape | wet | wet | wet | wet | wet | wet |
| Thickness of tape (mm) | 0.3 | 0.3 | 0.3 | 0.3 | 0.3 | 0.3 |
| Pressure on sample (g/cm$^2$) | 30 | 30 | 30 | 30 | 30 | 30 |
| Sealing temperature (° C.) | 400 | 400 | 400 | 400 | 400 | 400 |
| Stiffness[1] (N/mm) | 4,303 | 3,610 | 3,498 | 3,606 | 2,544 | 592 |
| Shear strength (MPa) | 2.67 | 1.93 | 1.85 | 1.39 | 0.44 | 0.05 |

[1]The reported value for stiffness is equal to the slope of the load versus displacement curve determined over the linear portion of the curve.

TABLE 7

| | \multicolumn{6}{c}{Example Number} | | | | | |
|---|---|---|---|---|---|---|
| | 37 | 38 | 39 | 40 | 41 | 42 |
| DPM003 glass frit | 70 | 70 | 70 | 80 | 80 | 80 |
| ZIRC | 30 | 30 | 30 | 20 | 20 | 20 |
| PE | 0.94 | 0.94 | 0.94 | 0.94 | 0.94 | 0.94 |
| CAR | 45 | 45 | 45 | 45 | 45 | 45 |
| PVB | 8.1 | 8.1 | 8.1 | 8.1 | 8.1 | 8.1 |
| PEG | 6 | 6 | 6 | 6 | 6 | 6 |
| DOP | 8 | 8 | 8 | 8 | 8 | 8 |
| Slurry milling time (hr.) | 4 | 8 | 12 | 4 | 8 | 12 |
| Type of milling media | glass ball | glass ball | glass ball | glass ball | glass ball | glass ball |
| Tape property | conforms | conforms | conforms | conforms | conforms | conforms |
| Surface treatment on tape | wet | wet | wet | wet | wet | wet |
| Thickness of tape (mm) | 0.3 | 0.3 | 0.3 | 0.3 | 0.3 | 0.3 |
| Pressure on sample (g/cm$^2$) | 30 | 30 | 30 | 30 | 30 | 30 |
| Sealing temperature (° C.) | 430 | 430 | 430 | 430 | 430 | 430 |
| CTE ($10^{-7}$/° C.) | | | | | | |
| Stiffness[1] (N/mm) | 1,230 | 2,267 | 2,249 | 1,865 | 2,594 | 3,145 |
| Shear strength (MPa) | 2.32 | 1.02 | 2.11 | 1.6 | 1.14 | 1.25 |

[1]The reported value for stiffness is equal to the slope of the load versus displacement curve determined over the linear portion of the curve.

Examples 43–48

Examples 43–44 were the prepared same as in Examples 2–3, except that a sealing temperature of 430° C. was used to prepare the samples for shear strength testing. Example 45 also differed from Example 2 in that the ratio of DPM003 glass frit to ZIR1 was 80:20 rather than 70:30.

Examples 46–47 were prepared the same as Examples 13–15, except that 0.60 millimeter glass sealing tape was used.

Example 48 differed from Example 13 in that it was prepared with a mixture of two glass frit materials, 44.5 grams DPM003 and 25.5 grams DPM1003 and was ball milled for about two hours.

For each specimen, the shear strength of the joint was measured as described in Test Procedure 1 and the results are listed in Table 8.

The complete disclosure of all patents, patent documents, and publications cited herein are incorporate by reference. The foregoing detailed description and examples have been given for clarity of understanding only. No unnecessary limitations are to be understood therefrom. The invention is not limited to the exact details shown and described for variations obvious to one skilled in the art will be included within the invention defined by the claims.

What is claimed is:

1. A tape for heat sealing substrates comprising:
   (i) a self-supporting layer of glass sealant having a first and a second major surface, the glass sealant layer comprising:
      a low-softening point glass;
      a plurality of refractory particles;
      a dispersant; and
      a binder and

TABLE 8

| | \multicolumn{6}{c}{Example Number} | | | | | |
|---|---|---|---|---|---|---|
| | 43 | 44 | 45 | 46 | 47 | 48 |
| DPM003 glass frit | 70 | 70 | 80 | 70 | 70 | 44.5 |
| DPM1003 glass frit | | | | | | 25.5 |
| ZIRC1 | 30 | 30 | 20 | | | |
| ZIRC | | | | 30 | 30 | 30 |
| PE | 0.94 | 0.94 | 0.94 | 0.94 | 0.94 | 0.94 |
| CAR | 45 | 45 | 45 | 45 | 45 | 45 |
| PVB | 8.1 | 8.1 | 8.1 | 8.1 | 8.1 | 8.1 |
| PEG | 6 | 6 | 6 | 6 | 6 | 6 |
| DOP | 8 | 8 | 8 | 8 | 8 | 8 |
| Slurry milling time (hr.) | 8 | 12 | 8 | 4 | 12 | 2 |
| Type of milling media | glass ball | glass ball | glass ball | alumina ball | alumina ball | glass ball |
| Tape property | conforms | conforms | conforms | conforms | conforms | conforms |
| Surface treatment on tape | wet | wet | wet | wet | wet | wet |
| Thickness of tape (mm) | 0.3 | 0.3 | 0.3 | 0.6 | 0.6 | 0.6 |
| Pressure on sample (g/cm$^2$) | 30 | 30 | 30 | 30 | 30 | 30 |
| Sealing temperature (° C.) | 430 | 430 | 400 | 400 | 400 | 400 |
| CTE ($10^{-7}$/° C. | | | | | | |
| Stiffness[1] (N/mm) | 4,976 | 2,864 | 2,423 | 3,830 | 3,991 | 4,847 |
| Shear strength MPa | 2.51 | 0.63 | 1.86 | 1.91 | 1.29 | 2.2 |

[1]The reported value for stiffness is equal to the slope of the load versus displacement curve determined over the linear portion of the curve.

(ii) at least one non-continuous adhesive layer attached to at least one major surface of the glass sealant layer.

2. The tape of claim 1, wherein the glass sealant layer further comprises a plasticizer.

3. The tape of claim 1, wherein the low softening point glass comprises on a theoretical oxide basis, in the range from about 20 to about 60 percent by weight SnO, in the range from about 5 to about 35 percent by weight ZnO, and in the range from about 30 to about 45 percent by weight $P_2O_5$, based on the total weight of glass material.

4. The tape of claim 1 wherein the low softening point glass comprises on on a theoretical oxide basis, in the range from about 20 to about 37 percent by weight SnO, in the range from about 24 to about 35 percent by weight ZnO, and in the range from about 39 to about 44 percent by weight $P_2O_5$, based on the total weight of the glass material.

5. The tape of claim 4 wherein the low softening point glass further includes up to about 4 percent by weight of $Li_2O$.

6. The tape of claim 1, further comprising a backing which is attached to the first major surface of the glass sealant layer.

7. The tape of claim 1, wherein the low-softening point glass is lead free.

8. The tape of claim 1, wherein the refractory particles are selected from the group consisting of silicon carbide particles, titanium carbide particles, zirconium carbide particles, graphite particles, alumina particles, zirconia particles, zircon particles, mullite particles, titania particles, metal particles, and combinations thereof.

9. The tape of claim 1, wherein the binder is selected from the group consisting of acrylic polymers, polyvinyl butyral, polyvinyl alcohol, and mixtures thereof.

10. The tape of claim 1, wherein the dispersant is selected from the group consisting of carboxylate polyelectrolyte dispersants, salts of carboxylate polyelectrolye dipersants, sulfonic acid dispersants, phosphate ester dispersants, acetylenic alcohol dispersants, and combinations thereof.

11. The tape of claim 1, wherein the at least one non-continuous adhesive layer is a hot-melt adhesive or a pressure sensitive adhesive.

12. The tape of claim 1, wherein the at least one non-continuous adhesive layer is selected from the group consisting of acrylate adhesives, urethane adhesives, tackified rubber adhesives, and silicone adhesives.

13. The tape of claim 1, further comprising one or more continuous adhesive layers attached to a major surface of the glass sealant layer.

14. The tape of claim 1, wherein the layer of glass sealant has a thickness ranging from about 0.1 mm to about 2.0 mm.

15. A tape for heat sealing substrates comprising:
(i) a self-supporting layer of glass sealant having a first and a second major surface, the glass sealant layer comprising:
   a low-softening point glass;
   refractory particles;
   a dispersant; and
   a binder;
(ii) a first adhesive layer having a first adhesive composition attached to the first major surface of the glass sealant layer; and
(iii) a second adhesive layer having a second adhesive composition attached to the second major surface of the glass sealant layer;
wherein the first adhesive composition and the second adhesive composition are different.

16. The tape of claim 15, wherein the low softening point glass comprises on a theoretical oxide basis, in the range from about 20 to about 60 percent by weight SnO, in the range from about 5 to about 35 percent by weight ZnO, and in the range from about 30 to about 45 percent by weight $P_2O_5$, based on the total weight of glass material.

17. The tape of claim 15, wherein the low softening point glass comprises on on a theoretical oxide basis, in the range from about 20 to about 37 percent by weight SnO, in the range from about 24 to about 35 percent by weight ZnO, and in the range from about 39 to about 44 percent by weight $P_2O_5$, based on the total weight of the glass material.

18. The tape of claim 15, wherein the low softening point glass further includes up to about 4 percent by weight of $Li_2O$.

19. The tape of claim 15, wherein the binder is selected from the group consisting of acrylic polymers, polyvinyl butyral, polyvinyl alcohol, and mixtures thereof.

20. The tape of claim 15, wherein at least one of the first adhesive layer and the second adhesive layer is a hot-melt adhesive or a pressure sensitive adhesive.

21. The tape of claim 15, wherein at least one of the first adhesive layer and the second adhesive layer is selected from the group consisting of acrylate adhesives, urethane adhesives, tackified rubber adhesives, and silicone adhesives.

22. The tape of claim 15, wherein the glass sealant layer further comprises a plasticizer.

23. The tape of claim 15, further comprising a backing which is releasably attached to at least one adhesive layer.

24. The tape of claim 15, wherein the low-softening point glass is lead-free.

25. The tape of claim 15, wherein the refractory particles are selected from the group consisting of silicon carbide particles, titanium carbide particles, zirconium carbide particles, graphite particles, alumina particles, zirconia particles, zircon particles, mullite particles, titania particles, metal particles, and combinations thereof.

26. The tape of claim 15, wherein the dispersant is selected from the group consisting of carboxylated polyelectrolyte dispersants, salts of carboxylated polyelectrolyte dispersants, sulfonic acid dispersants, phosphate ester dispersants, acetylenic alcohol dispersants, and combinations thereof.

27. The tape of claim 15, wherein a first non-continuous adhesive layer is attached to the first major surface of the glass sealant layer and a second non-continuous adhesive layer is attached to the second major surface of the glass sealant layer.

28. The tape of claim 15, wherein the layer of glass sealent has a thickness ranging from about 0.1 mm to about 2.0 mm.

29. A method of making a sealed article comprising the steps of:
(i) placing a tape for heat sealing substrates according to claim 1 in contact with a first substrate;

(ii) placing a second substrate in contact with the tape so that the tape is at least partially located between the first substrate and the second substrate thereby forming an assembly in which the tape is at least partially interposed between the first and the second substrates;

(iii) heating the assembly to a temperature capable of melting the glass sealant layer;

(iv) at least partially melting the glass sealant layer; and (v) cooling the assembly so that the at least partially melted glass sealant hardens.

30. The method of making a sealed article according to claim 29, wherein the heating step is conducted at a temperature ranging from about 350° C. to about 500° C.

31. The method of making a sealed article according to claim 29, wherein the first substrate and the second substrate are glass.

32. A sealed article produced by the method of claim 29.

* * * * *

UNITED STATES PATENT AND TRADEMARK OFFICE
CERTIFICATE OF CORRECTION

PATENT NO. : 6,218,005 B1  Page 1 of 1
DATED : April 17, 2001
INVENTOR(S) : Kyung H. Moh It is certified that error appears in the above-identified patent and that said Letters Patent is hereby corrected as shown below:

Column 5,
Line 60, "thereof Water may be used," should be -- thereof. Water may be used, --

Column 6,
Line 58, "bum-off" should be -- burn-off --
Line 62, "bun-off." should be -- burn-off. --

Column 7,
Line 63, "30 C" should be -- 30° C --

Column 8,
Line 11, "effective to bum out organic" should be -- effective to burn out organic --

Column 9,
Line 48, "$8 \times 10^{-6 \circ}C$." should be -- $8 \times 10^{-6}/°C$ --

Column 19,
Line 26, "Examples 43-44 were the prepared same as" should be -- Examples 43-44 were prepared the same as --

Column 21, claim 4,
Line 12, "glass comprises on on a theoretical" should be -- glass comprises on a theoretical --

Column 22, claim 17,
Line 12, "glass comprises on on a theoretical" should be -- glass comprises on a theoretical --

Signed and Sealed this

Second Day of April, 2002

Attest:

JAMES E. ROGAN
Attesting Officer  Director of the United States Patent and Trademark Office